Jan. 5, 1965   W. STELZER   3,164,414
ELECTRICALLY CONTROLLED TRAILER BRAKE SYSTEM
Filed Aug. 9, 1961
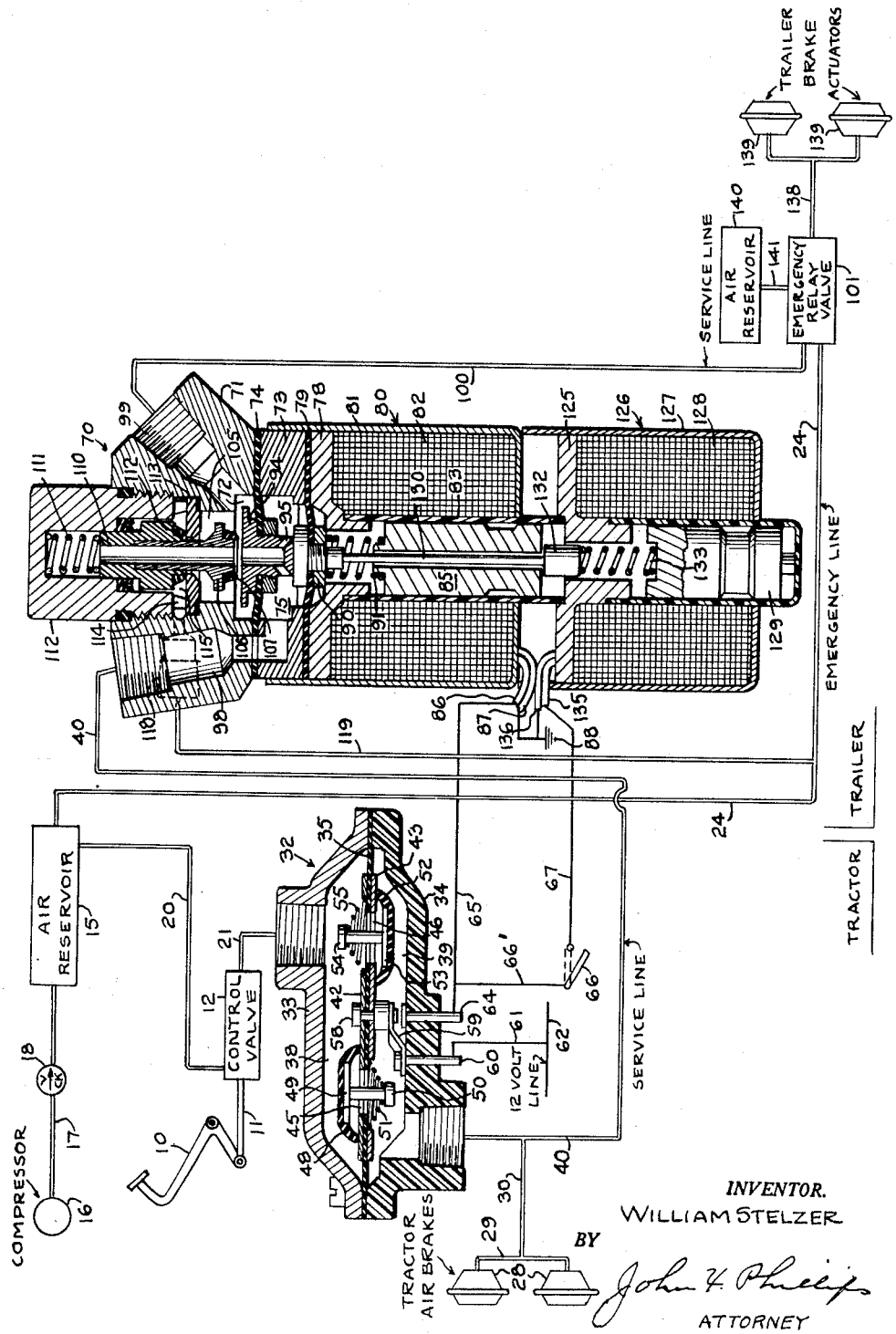
INVENTOR.
WILLIAM STELZER
BY
John F. Phillips
ATTORNEY

United States Patent Office 3,164,414
Patented Jan. 5, 1965

3,164,414
ELECTRICALLY CONTROLLED TRAILER
BRAKE SYSTEM
William Stelzer, Bloomfield Hills, Mich., assignor to
Kelsey-Hayes Company, Romulus, Mich., a corporation
of Delaware
Filed Aug. 9, 1961, Ser. No. 130,344
3 Claims. (Cl. 303—6)

This invention relates to an electrically controlled tractor-trailer brake system and more especially to a pedal controlled switch mechanism which, in turn, controls the application of the trailer brakes.

In my co-pending application Serial No. 130,360 filed August 9, 1961 I have disclosed a tractor-trailer brake system wherein a novel type of solenoid operated valve mechanism is employed and which is operable upon initial movement of the brake pedal for snubbing the trailer brakes without appreciable application of the tractor brakes, and wherein during initial operation of the brake system the trailer brakes are applied to a greater extent than the tractor brakes to insure against the jack-knifing of the trailer. My co-pending application also discloses, in conjunction with said solenoid operated valve mechanism, another solenoid which cooperates with the first mentioned solenoid to provide an increased trailer brake application when the vehicle is heavily loaded. The co-pending application referred to discloses but does not claim the novel type of pressure operated switch mechanism forming the principal subject matter of the present application.

An important object of the present invention is to utilize a weak signal from the foot operated valve mechanism of the brake system of a tractor-trailer combination to energize the solenoid valve to transmit pressure to the trailer brakes via the usual emergency relay valve, the utilization of such weak signal being made possible by a novel type of pressure operated switch mechanism.

A further object is to provide a pressure operable switch through which fluid flows from the foot operated control valve to the tractor air brakes and to the solenoid mechanism valve system referred to through a service line, and to so construct the pressure operated switch that a very weak pressure from the control valve will operate the switch to energize the solenoid valve mechanism and wherein the novel switch effects tractor-trailer braking without an appreciable loss in pressure in the system.

A further object is to provide a novel switch mechanism of the character referred to having a casing provided with two pressure chambers, one of which communicates with the control valve and the other of which communicates with the tractor air brakes and the service line, and to divide said chambers by a highly flexible diaphragm which operates the switch element and which is provided with light spring-pressed oppositely opening valves whereby a weak signal to the first mentioned chamber of the switch mechanism will move the diaphragm to operate the switch and thus energize the solenoid valve mechanism without passing pressure from the first named chamber to the second named chamber, thus making it possible to provide a snubbing action of the trailer brakes without energizing the tractor air brakes.

A further object is to provide such a switch mechanism wherein one valve associated with the diaphragm is adapted to open by pressure in the first named chamber of the switch mechanism to supply pressure to the tractor air brakes and to the forward end of the service line while the other valve is adapted to open into the first named chamber to exhaust pressure from the system through the control valve means when the brake pedal is released.

Other objects and advantages of the invention will become apparent during the course of the following description.

In the drawing I have shown one embodiment of the invention. In this showing

The figure is a diagrammatic view of the tractor-trailer brake system, the solenoid valve mechanism and the pressure controlled switch being structurally shown in axial section.

Referring to the drawing numeral 10 indicates a conventional brake pedal connected by a rod 11 to a follow-up control valve mechanism 12 of conventional type. This valve operates to pass pressure from a source to the brake system to operate the brakes thereof. To this end, the tractor is provided with an air reservoir 15 maintained under predetermined pressure by a compressor 16 connected by a line 17 to the air reservoir 15, a check valve 18 being arranged in the line 17.

The reservoir 15 is connected by a line 20 to the control valve 12 and when the brake pedal 10 is operated, the control valve connects the line 20 to a pipe 21 and it is pressure in this pipe which is utilized for controlling the application of the brakes. The reservoir 15 is also connected to the forward end of an emergency line 24 which extends rearwardly to the trailer for connection to the emergency relay valve referred to below.

The tractor is provided with the usual brakes operable by pressure motors 28 to which air under pressure is supplied through branch lines 29 from a supply pipe 30. This air pressure is supplied through an air operated switch mechanism indicated as a whole with the numeral 32. This switch mechanism comprises upper and lower casing sections 33 and 34, the latter of which is formed of a suitable plastic or other insulating material for a reason which will become apparent. A diaphragm 35 is clamped between the casing sections 33 and 34 and forms with such casing sections upper and lower chambers 38 and 39 the former of which communicates with the pipe 21 and the latter of which communicates with the forward end 40 of the service line, which line extends rearwardly to the trailer for connection with the solenoid valve mechanism forming the principal subject matter of my co-pending application referred to and described more in detail below. The line 30 is tapped into the line 40 to receive pressure whenever such pressure is present in the chamber 39 incident to the operation of the switch mechanism 32.

The diaphragm 35 is clamped between plates 42 and 43 and these plates and the diaphragm 35 are provided with ports 45 and 46.

A cupped resilient valve 48 controls the port 45. This valve is bonded to a head 49 carried by a headed stem 50, and a very light spring 51 biases the valve 48 to closed position. The valve 48 is arranged in the chamber 38 and prevents any flow of fluid from such chamber to the chamber 39. A similar valve 52 is arranged in the chamber 39 and controls the port 46. The valve 52 is bonded to a head 53 carried by a headed stem 54. A very light spring 55 biases the valve 52 to closed position.

The diaphragm 35 and plates 42 and 43 are clamped together by stem 58. The lower end of this stem engages a resilient switch arm 59 connected to the casing section 34 by a post 60 secured in position in any suitable manner and connected to a wire 61. This wire in turn is connected to the conventional tractor 12-volt line 62.

Movement of the diaphragm 35 downwardly engages the contact arm 59 with the adjacent contact head of a post 64 to which is connected one end of a wire 65. A wire 66' is connected between the wire 65 and a manual switch 66, the stationary contact of which is connected to one end of a wire 67, leading rearwardly to the trailer. As will become apparent, the switch 66 is open when the trailer is running light or relatively lightly loaded, and is closed when the trailer is relatively heavily loaded.

An electrically operable valve mechanism, indicated as a whole by the numeral 70, is mounted on the trailer. This valve mechanism comprises a preferably die cast body 71 having a chamber 72 therein. The body 71 is clamped to a circular spacer plate 73, and a diaphragm 74 is clamped between the members 71 and 73. The diaphragm 74 has one face exposed to pressure in the chamber 72 and its other face exposed to pressure in a chamber 75 formed in the spacer 73.

Another spacer 78 is clamped to the spacer 73 with a diaphragm 79 clamped therebetween, and the spacer 78 forms the base plate of a solenoid 80 having a shell 81, coil 82 and cylindrical core 83. The solenoid 80 is provided with an armature 85 movable upwardly upon energization of the solenoid, as will become apparent. One end of the coil of the solenoid, indicated by the wire 86, is connected to one end of the wire 65. The other end of the solenoid coil, indicated by the wire 87, is connected to a ground 88. Therefore, it will be apparent that when the switch 59 is moved downwardly to engage the contact 64, the solenoid 80 will be energized. A nut and screw combination 90 is clamped to the diaphragm 79 centrally thereof, and a spring 91 engages at opposite ends against the nut and screw combination and against the armature 85 so that upon energization of solenoid 80, the force of the armature 85 will be resiliently transmitted to the center of the diaphragm 79 to move it upwardly.

An axially bored thimble 94 is clamped against the central portion of the diaphragm 74 and has its axial bore communicating with the chamber 75 through ports 95. Thus, it will be apparent that the chambers 72 and 75 are adapted to normally communicate with each other so that pressures are balanced therein. The chamber 75 communicates through suitable porting 98 with the other end of the fluid line 40. The chamber 72 communicates through suitable porting 99 with one end of a fluid line 100, the other end of which is connected to the trailer emergency relay valve 101. The emergency line 24 is also connected to the emergency relay valve 101 for the conventional purpose.

The body 70 is provided therein with a chamber 105 in fixed communication with the chamber 72. A valve stem 106 carries an annular resilient valve 107 normally disengaged from, but movable downwardly into, engagement with the thimble 94 to close the axial passage therethrough to the chamber 72.

The valve stem 106 is carried by a plunger 110 biased downwardly by a spring 111 mounted in a plug 112 in which the plunger 110 is slidable. The plunger 110 carries at its lower end a resilient valve 112 engageable with a centrally apertured plate 113 mounted in the body 70. This plate is maintained in sealed engagement with the body 70 by fingers 114 carried by the plug 112. Above the plate 113 is formed a chamber 115 normally closed to communication with the chamber 105 through the axial passage through the plate 113 by the normally closed valve 112. When the parts are in the normal positions shown in FIGURE 1, therefore, it will be apparent that the chambers 105, 72 and 75 are in communication with each other. The chamber 115 communicates through suitable porting 118 with one end of a pipe line 119 having its other end connected to the emergency line 24.

The core 83 is connected to the end plate 125 of a second solenoid 126 having a shell 127, coil 128 and armature 129. The armature 85 of the solenoid 80 has an axial bore through which extends a stem 130, the upper end of which abuts the screw and nut combination 90. The other end of the stem 130 is provided with a head 132. One end of a spring 133 engages the head 132 and has its other end seating against the armature 129. Thus, it will be apparent that when both solenoids are energized, the spring 91 transmits force from the armature 85 to the diaphragm 79, while the spring 133 transmits force from the armature 129 to the diaphragm 79 through the stem 130. One end of the coil 128, represented by the wire 135, is connected to the wire 67, while the other end of the coil 128, represented by the wire 136, is connected to the ground 88.

The mechanism just described functions to control the emergency valve 101 to supply pressure through lines 138 to the pressure operated trailer brake actuators 139. Emergency pressure for operating these brakes is supplied from an air reservoir 140, maintained in any conventional manner under the proper pressure. This reservoir 140 is connected by line 141 to the emergency relay valve 101 so that in the event of a break in the emergency line 24, pressure is supplied from the reservoir 140, through the emergency relay valve 101, to operate the trailer brake actuators 139. In normal operation, the emergency relay valve 101 is controlled by pressure in the line 100, and pressure for operating the brake actuators 139 is supplied from the line 24.

*Operation*

The valve device 32 is arranged as closely as possible to the control valve 12 to eliminate any lag in the operation of the valve device 32 upon initial brake pedal operation. This device is highly novel in its controlling of its associated electric circuits and pressure lines. As previously stated, the springs 51 and 55 are quite light, and accordingly while little pressure is required to move the diaphragm 35, the springs referred to will maintain sufficient differential pressures to accomplish such movement. This is particularly important with respect to the valve 52 since this valve will remain closed under the influence of pressure in the chamber 38 sufficient to move the diaphragm 35 and close the switch 59. The spring 51 is merely strong enough to maintain the valve 48 closed under the conditions referred to and opens at a relatively low pressure to exhaust air from the chamber 39 when the brake pedal is released, which operation is also described below.

In the drawing all of the parts are shown in normal positions. If it is desired to snub the trailer brakes, the operator will very slightly depress the brake pedal 10 to admit only enough air under pressure through line 21 to the chamber 38 to slightly raise the pressure therein. Because of the area thereof, the diaphragm 35 will be actuated by a very slight increase in pressure in the chamber 38 to close the switch 59 without opening the valve 52. Thus, no pressure will flow into the chamber 39 and the tractor brakes will not be operated. The spring 55 is very light, but even so, it is sufficient to maintain a pressure differential between the chambers 38 and 39 to operate the switch 59. If the valve 52 opens at all, it will be only slightly cracked and insufficient pressure will be supplied to the tractor brake actuators 28 to effect any appreciable application of the tractor brakes.

The operation now being described takes place assuming that the switch 66 is in open position with the trailer running light or lightly loaded.

The closing of the switch 59, therefore, will not energize the solenoid 126. However, a circuit will be closed through the switch 59, wire 65, solenoid 80 and ground 88. Thus, the armature 85 will move upwardly and transmit force through the spring 91, and the screw and nut 90 will be moved upwardly to elevate the thimble 94. The upper face of this thimble forms a valve seat for the valve 107, and upward movement of such seat effects closing of the valve 107, thus disconnecting the chamber 72 from the chamber 75. The valve stem 106 will be then slightly raised to open the valve 112, whereupon pressure from the emergency line 24 will flow through line 119 into the chamber 115, thence, into chamber 105 and through porting 99 through the rear service line 100 to the emergency relay valve 101 to operate this valve and supply pressure from the emergency line 24 to the trailer brake actuators 139 to snub the trailer brakes.

The force exerted by the armature 85 is limited to the force transmitted by the spring 91, which is normally fully extended. Upward movement of the armature to compress the spring 91 is limited by the flange of the plate 78 projecting downwardly into the core 83. Acting against such spring force at this time will be pressure supplied from the line 119 to the chamber 115 and then downwardly around the stem 106, such pressure acting downwardly on the diaphragm 74. Therefore, when a certain pressure is reached in the chamber 72, the force against the diaphragm 74 causes the spring 91 to yield allowing the valve 112 to close and thus disconnect the chamber 115 from the chamber 72. As further described below, the valve 112, diaphragm 74 and spring 91 together form a pressure regulator to keep the initial pressure supplied through line 100 at a predetermined level, and the pressure transmitted to the emergency relay valve 101 causes the latter to apply the trailer brakes proportional to the magnitude of the signal transmitted through the line 40.

Assuming that brake pedal operation is continued beyond the point referred to above, the admission of pressure to the chamber 38 will open the valve 52, thus admitting pressure to the chamber 39, and to the lines 40, 30, and 29. Accordingly, the tractor brakes will be applied in accordance with pressures supplied to the chamber 39 by operation of the control valve 12. Pressure admitted to the line 40 will flow into the chamber 75. Due to the length of the line 40, pressure will increase in the chamber 75 after some slight lag which will not, however, have delayed the application of the trailer brakes in the manner described above.

Any pressure increase in the chamber 75 has the effect of augmenting the force of the spring 91 because of the difference in the areas of the diaphragms 74 and 79 exposed to the chamber 75. In other words, since the diaphragm 74 has a slightly larger effective area than the diaphragm 79, there will be a net effective force acting upwardly to augment the force of the spring 91. Thus, greater pressure is required in the chamber 72 from the pressure line 119 to overcome the combined pressure and spring forces acting upwardly on the seat of the valve 107. Accordingly, there will be a progressive increase in pressure in the line 100, above that which is supplied for the snubbing of the trailer brakes, before the pressure acting downwardly on the diaphragm 74 allows the valve 112 to close. This progressive increase in pressure supplied to the line 100 is at a rate less than the rate of increase in the service line 40.

It will be apparent that the valve seat 94 engages the valve 107 at the proper time to cut off communication between the pressure line 119 and the line 100. If pressure should build up slightly in the chamber 105, such pressure, acting downwardly on the diaphragm 74, will crack the valve 107. On the other hand, if pressure in the chamber 105 drops slightly, the net pressure acting upwardly on the diaphragm 74 from the chamber 75 will slightly elevate the valve stem 106 to crack the valve 112 and admit additional pressure from the chamber 115 to the chamber 105. When this pressure reaches the proper point, the diaphragm 74 will move downwardly to allow the valve 112 to again close. Thus for any given position of the brake pedal, the mechanism just described acts as a pressure regulating mechanism. It also will be apparent that if the operator backs off on the brake pedal to lessen the braking, a drop in pressure in the service line 40 renders pressure in the chamber 72 effective for cracking the valve 107 to exhaust the excess pressure from the chamber 72 to the chamber 75. Conversely, if the operator depresses the pedal 10 to a greater extent for increased braking, there will be a corresponding increase in pressure in the chamber 75 to lift the diaphragm 74 and valve stem 106 to admit more pressure from the chamber 115 into the chamber 105, and accordingly pressure in the line 100 will increase to the same extent as pressure in the line 40 to provide greater trailer brake actuation.

If the operator now releases the brake pedal, the control valve 12 cuts off communication between the lines 20 and 21. The valve 48 will now open to permit the escape of pressure from the lines 30 and 40 to the chamber 38 and thus to the control valve 12 to be vented to the atmosphere. The line 40 having been opened to the atmosphere and the circuit for the solenoid 80 having been broken by opening the swicth 59, the chamber 75 will be vented together with the chambers 72 and 105. Thus, the line 100 will be opened to the line 40 and the entire service line will be vented for the return of the valve parts in FIGURE 1 to their normal positions.

The foregoing operations occur if the circuit for the solenoid 126 remains open. This is the operation which takes place if the trailer is carrying no more than a light load. If the trailer is loaded, the operator will close the switch 60, and a circuit parallel to the circuit for the solenoid 80 will be closed through the solenoid 126. In such case, the armature 129 will move upwardly to place the normally unloaded spring 133 under a load to exert an upward force through the stem 130. This stem 130 abuts at its upper end against the screw and nut 90, and the force of the spring 133 will aid the spring 91 in exerting an upward force against the members 90, 94 and 106 to open the valve 112, and a greater counterbalancing force, namely pressure in the chamber 72, will be necessary to close the valve 112 in accordance with the foregoing operation.

Accordingly, the effective pressures for controlling the trailer brake actuators 139 will continue their abrupt rise until the counteracting pressure acting downwardly on the diaphragm 74 becomes effective to allow the valve 112 to seat and thus cut off further admission of air from the chamber 115. Under conditions where the solenoid 126 is energized, therefore, a greater trailer brake actuation will occur than will occur when the solenoid 126 is not energized. The valve mechanism thus provides greater trailer brake actuation in initial stages of brake operation when the vehicle is loaded and the switch 66 is closed, than otherwise would occur.

From the foregoing it will be apparent that the present system operates very effectively to provide a controlled application of the trailer brakes ahead of the application of the tractor brakes. Also the system operates very accurately to provide for a snubbing action of the trailer brakes without actuation of the trailer brakes. Such operation is fully disclosed in detail in my co-pending application, Serial No. 130,360, referred to above. The initial actuation of the trailer brakes independently of the tractor brakes is increased as to its efficiency by the novel fluid pressure switch mechanism 32. The spring 51 is sufficiently light so that when the brake pedal is released, the residual pressure in the chamber 39 will be negligible, the valve 48 under such conditions acting as a check valve to allow the escape of fluid from the chamber 39 to the chamber 38. Conversely, while the spring 55 is also quite light, it retains the valve 52 on its seat, to retain in the chamber 38 the very light pressure necessary for operating the diaphragm 35 to close the switch 59 to operate the solenoid valve mechanism. The fluid pressure valve therefore constitutes a highly efficient control means for the entire system and so operates that upon initial movement of the brake pedal to supply fluid at a low pressure to the chamber 38, the trailer brakes will be actuated in accordance with the foregoing description without actuating the trailer brakes. On the other hand, the lightness of the spring 55 is such that upon a fuller movement of the brake pedal 10, the valve 52 will open and the pressure differential caused by the spring 55, between the chambers 38 and 39, will be so slight as not to materially affect the operation of the system. This differential pressure in fact is so slight that the functioning of the solenoid valve system as a regulating valve provides pressure in the line 100 which is very close to pressure in the line 40. From a practical standpoint, therefore, it may be said that the trailer brakes, in a regular brake pedal operation, will be energized by the same pressure which affects the tractor brakes.

It is to be understood that the form of the invention herewith shown and described is to be taken as a preferred example of the same and that various changes in the shape, size and arrangement of parts may be made as do not depart from the spirit of the invention or the scope of the appended claims.

I claim:

1. In a fluid pressure system, a first fluid pressure operable device, a second fluid pressure operable device, a valve mechanism operable for effecting the admission of pressure to said second pressure operable device, electro-magnetic means for operating said valve mechanism, a controlled fluid inlet line, a fluid outlet line connected to said first pressure operable device, and a control device having an inlet chamber connected to said inlet line and an outlet chamber connected to said outlet line, a switch, a pressure responsive diaphragm in said control device, said switch being in said outlet chamber and having mechanical engagement with said diaphragm to be closed thereby to energize said electro-magnetic device when pressure in said inlet chamber increases, said diaphragm having an aperture, and a normally closed valve controlling said aperture and biased to closed position against said diaphragm with sufficient force so that said pressure responsive element will close said switch prior to the opening of said valve for the flow of fluid from said inlet chamber to said outlet chamber.

2. An electro-pneumatic control device comprising a casing, a diaphragm dividing said casing to form an inlet chamber connectible to a source of controlled pressure and an outlet chamber connectible to a device to be pressure operated, a switch engageable by said diaphragm to be moved thereby to close a circuit, said diaphragm having a port, a valve in said outlet chamber normally engaging said diaphragm to close said port, and a spring biasing said valve to closed position whereby said diaphragm will close said switch below a pressure at which said valve will open for the flow of fluid from said inlet chamber to said outlet chamber.

3. A device according to claim 2 wherein said diaphragm is provided with a second port, a check valve in said inlet chamber normally closing said inlet port, and a spring biasing said check valve to closed position.

References Cited in the file of this patent

UNITED STATES PATENTS

| | | |
|---|---|---|
| 2,444,190 | Fitch | June 29, 1948 |
| 2,586,450 | Whitten et al. | Feb. 19, 1952 |
| 2,941,844 | Stelzer | June 21, 1960 |